United States Patent [19]
Colmant et al.

[11] Patent Number: 6,144,662
[45] Date of Patent: Nov. 7, 2000

[54] FAST ROUTING AND NON-BLOCKING SWITCH WHICH ACCOMODATES MULTICASTING AND VARIABLE LENGTH PACKETS

[75] Inventors: Michel Colmant, Zurich; Antonius P. Engbersen, Feusisberg; Marco Heddes, Thalwil, all of Switzerland; Marinus J. M. van Weert, Helmond, Netherlands

[73] Assignee: International Business Machines Corporation, Armonk, N.Y.

[21] Appl. No.: 09/000,100

[22] PCT Filed: Jul. 9, 1996

[86] PCT No.: PCT/IB96/00658

§ 371 Date: Apr. 13, 1998

§ 102(e) Date: Apr. 13, 1998

[87] PCT Pub. No.: WO98/02013

PCT Pub. Date: Jan. 15, 1998

[51] Int. Cl.[7] .................................................. H04L 12/56
[52] U.S. Cl. ............................................. 370/390; 370/414
[58] Field of Search .................................... 370/229, 395, 370/389, 390, 392, 398, 413, 414

[56] References Cited

U.S. PATENT DOCUMENTS 5,838,681  11/1998  Bonomi et al. ......................... 370/395
5,859,835  1/1999  Varma et al. .......................... 370/229
5,862,136  1/1999  Irwin ..................................... 370/395

OTHER PUBLICATIONS

PUPA 4–47828, Abstract.
PUPA 62–177647, Abstract.
PUPA 63–187750, Abstract.
PUPA 6–169326, Abstract.
PUPA 62–225050, Abstract.
PUPA 4–175034, Abstract.
"A Study on shared buffer type ATM switch" Japan Institute of Information and Communication, vol. J72–B–I, No. 11, pp1070–1075, Nov. 1989 (No Translation).

*Primary Examiner*—Hassan Kizou
*Assistant Examiner*—John Pezzlo
*Attorney, Agent, or Firm*—Daniel E. McConnell

[57] ABSTRACT

The invention relates to a switching device which transports data packets from input ports to selected output ports. The payload of the packets is stored in a storage means. A switching means is arranged which has more switch outputs than switch inputs and which switches sequentially between one switch input and several switch outputs while storing the payloads. Furthermore, the invention relates to a storing method which uses switching means to store payloads in a sequential order and to a switching apparatus comprising several switching devices. Furthermore, the invention relates to systems using the switching device as a scaleable module.

32 Claims, 5 Drawing Sheets

FAST ROUTING AND NON-BLOCKING SWITCH WHICH ACCOMODATES MULTICASTING AND VARIABLE LENGTH PACKETS

TECHNICAL FIELD

The present invention relates to a switching device for fixed-size packets of data, particularly for ATM-packets. More particularly it is related to a switching device with several input ports and several output ports and is determined for the transportation of incoming packets according to their header to one or more designated output ports. Further the invention relates to a method for transporting fixed-size packets from several input ports to several output ports, particularly for ATM-packets. The invention is also related to a switching apparatus comprising several switching devices.

BACKGROUND OF THE INVENTION

Fast switching of information, be it samples of analog signals or alphanumeric data, is an important task in a communication network. The network nodes in which lines or transmission links from various directions are interconnected for exchanging information between them are often the cause of delay in the transmission. If much traffic is concentrated in a node, and if in particular most of the traffic passes through only few of the links, increased delays or even loss of information are often encountered. It is therefore desirable to have switching nodes which allow fast routing and are at least partially non-blocking.

In EP 312628 is described a switching apparatus for interconnecting a plurality of incoming and outgoing transmission links of a communication network, or for exchanging data between incoming and outgoing computer- and workstation connection links. Furthermore, known packet formats are described.

An overview over prior art switching technology is given on the Internet page www.zurich.ibm.com/Technology/ATM/SWOCPWP, wherein an introduction into the PRIZMA Chip is illustrated. Another source for information about this topic is the publication "A flexible shared-buffer switch for ATM at Gbit/s rates" by W. E. Denzel, A. P. J. Engbersen, I. Iliadis in Computer Networks and ISDN Systems, (0169-7552194), Elsevier Science B.V., Vol. 27, No. 4, pp. 611–624.

The PRIZMA chip has 16 input ports and 16 output ports which provide a port speed of 300–400 Mbit/s. The switch's principle is first to route incoming packets through a fully parallel I/O routing tree and then to queue the routed packets in an output buffer. In addition to this the chip uses a separation between data (payload) and control (header) flow. Only the payloads are stored in a dynamically shared output buffering storage. With this architecture head-of-the-line-queueing is avoided. The PRIZMA chip has a scaleable architecture and hence offers multiple expansion capabilities with which the port speed, the number of ports and the data throughput can be increased. These expansions can be realized based on a modular use of the PRIZMA. Also single-stage or multi-stage switch fabrics can be constructed in a modular way.

The PRIZMA chip is especially suited for broadband telecommunications, based on ATM, i.e. the Asynchronous Transfer Mode. However, the concept is not restricted to ATM-oriented architectural environments. ATM is based on short, fixed-length packets, often called cells and is supposed to be applied as the integrated switching and transmission standard for the future public Broadband Integrated Services Digital Network (BISDN). PRIZMA's topology and queuing arrangement for contention resolution employs a high degree of parallelism. The routing function is performed in a distributed way at the hardware level, referred to as self-routing. ATM packets are classified into several packet types, particularly packet types with different payload sizes, and the PRIZMA chip is dedicated to handle packets with a payload up to 64 bytes. However also packet payloads with 12, 16, 32 or 48 bytes are often to be transported.

A typical dimension of the shared memory section in PRIZMA contains 128 storage cells with a cell length of 64 bytes for storing at maximum 128 packets, independent from their size. When the PRIZMA chip is used in a speed-expansion mode, whereby four chips operate in parallel and each chip receives a quarter of the payload, automatically smaller payloads occur, which means that a considerable amount of memory is not used.

Furthermore, the write and read processes of payloads in the memory are synchronous, which means that asynchronously arriving packets have to wait until the common write pointer for all storage cells is passing the first byte for all storage cells. This can lead to additional latency of up to 63 clock cycles.

OBJECT AND ADVANTAGES OF THE INVENTION

It is therefore an object of the invention to provide a switching device for transporting incoming fixed-size packets of data from a plurality of input ports to a plurality of output ports which provides a high packet throughput.

The device according to the independent claim 1 shows the advantage that the switch offers a relatively high performance and at the same time uses architectural components with only relatively small dimensions, particularly input means with a reduced number of outputs, more particularly with lesser outputs than the storing means has storage cells.

The subclaims of claim 1 show different measures which represent advantageous improvements and developments of the invention claimed in claim 1.

The device according to claim 2 shows the advantage that in case of a packet type with the smallest possible size a minimum of storage space is wasted and nevertheless the possibility remains to store payloads of bigger-sized packet types. The switching device can therefore be programmed which packet types it has to handle and by this offers optimal storage usage for different packet types.

When the number of storage cells connected to one switching means is chosen such that the sum of their storage cell sizes suffices to store the entire payload of one packet of a predetermined biggest-sized packet type which is to be handled with said switching device, in any case of packet type the storage cells connected to said switching means suffice to store one packet payload entirely. Hence only one switching means with its dedicated storage cells need be addressed for storing one packet payload. This dimensioning rule is also advantageous since when the storing means is divided into such groups of storage cells each group can be written to independently from another.

The fact that only one group output controlling means is assigned to a single storage group containing a plurality of storage cells is advantageous because the amount of hardware and software can be kept low while exploiting the fact that there is a low probability that several output ports want to access the same storage group at the same time. The probability of a simultaneous access to the same storage group is low, because in an average traffic often packet bursts occur, i.e. subsequent packets are heading for the same output port. With bursts, often an entire storage group contains data which is destinated for the same output port. A second reason for a small probability of performance deterioration is the fact that at one point of time not all output ports are busy and that the storage groups are not always filled up totally and finally the fact that there are much more storage groups than output ports.

Providing for each output port a separate output queue simplifies the way how to route the stored payloads to reach their destinations. Further this is a very simple way of handling multicast packets.

A switch control means is proving advantageous since with such a means information about in which storage cell a payload is stored is easily derivable and further this means can be programmed for different packet types, respectively grouping factors.

A translation means for creating a data pattern, particularly a bitmap for each packet represents a means for easily extracting routing information from the packet headers. Further, this proves useful for multicast packets.

The routing information in the packet header is best used by receiving in a queue controlling means the assigned data pattern and using it for an enabling function for the storage of the respective payload address in the output queues. The payload address is herein defined as the combination of the storage group address which belongs to the storage group which is receiving the respective payload, with the storage cell number wherein the payload is stored. In the case of payloads occupying several subsequent storage cells the storage cell number can be chosen for example as the storage cell containing the first byte of the payload. Again this provides a useful means for achieving fast and easy routing of payloads to their destination.

Since the storage process of the payloads, particularly for payloads with a small number of bytes is quite fast, backpressure can be better avoided when the information about which storage cell contains which payload is processed in parallel for several input ports. Backpressure can for example occur when the writing process of the payloads is faster than the management of the pieces of information about which storage cell contains which payload, since the storing means then can be filled up totally and can no longer store further incoming packet payloads.

When a counting means is counting the number of readout processes for each storage group for each multicast packet, the payload needs be stored only once and the risk to lose packets or to lack providing all output ports with their copy of a multicast packet is reduced. Furthermore, if only one counting means is provided for each storage group this still suffices to keep the above risk low not only for multicast packets and simultaneously reduces the number of necessary counters for the whole switching device.

Using the data pattern for counting purposes in addition to its enabling function is a very efficient use of information which reduces the involved hardware and software.

When the counting means is split up into two counters, the implemented counters need only be unidirectionally counting, which is less complicated. Additionally, the two counters can operate concurrently and independent from each other which reduces hardware complexity.

Bookkeeping of the free storage group addresses provides a very quick access to non-occupied storage group addresses and reduces the probability that storage group addresses are reused before their entire content has been read out.

It is another object of the invention to provide a method for transporting incoming fixed-size packets of data from a plurality of input ports to a plurality of output ports by storing the packet payloads in storing means, using switching means for switching between subsequent storage cells.

It is further an object of the invention to provide a switching apparatus comprising several of the above switching devices. Such an apparatus provides a higher performance, such as higher port speed, higher throughput or more input- and output ports.

The apparatus can be built up from identical switching devices, more particularly identical printed circuit boards (PCB's), when the switching devices are comprising portmapping means which corrects wrong destination/output pairings due to the identical design of the switching devices, for instance on identical PCB's.

When each of the switching devices is grouped together with one of the arbitration means and with one of said selection means as a scaleable module, the production costs can be reduced since the same module can be used as a single swicthing device or in a switching apparatus with several switching devices.

A master/slave arrangement as claimed in claim 32 is advantageous since with it a higher throughput can be achieved.

SUMMARY OF THE INVENTION

In the invented switching device storage cells are grouped together via a switching means. By doing this the storage cell sizes can be dimensioned such that a small-sized packet payload fits into one storage cell and packets of bigger payload size are using several subsequent storage cells.

DESCRIPTION OF THE DRAWINGS

Examples of the invention are depicted in the drawings and described in detail below by way of example. It is shown in FIG. 1*a:* the first part of a functional block diagram of an embodiment of a switch, FIG. 1*b:* the second part of a functional block diagram of an embodiment of a switch.

DETAILED DESCRIPTION OF THE INVENTION

In the following the various exemplary embodiments of the invention are described. The number of devices and ports is chosen for sake of example only and can be varied without leaving the scope of the invention. For sake of clarity in FIGS. 1 to 3*b* for a number of identical elements arranged in parallel only the first and the last representative of these elements is depicted, but in the description all elements are referred to in total.

Figure 1A:
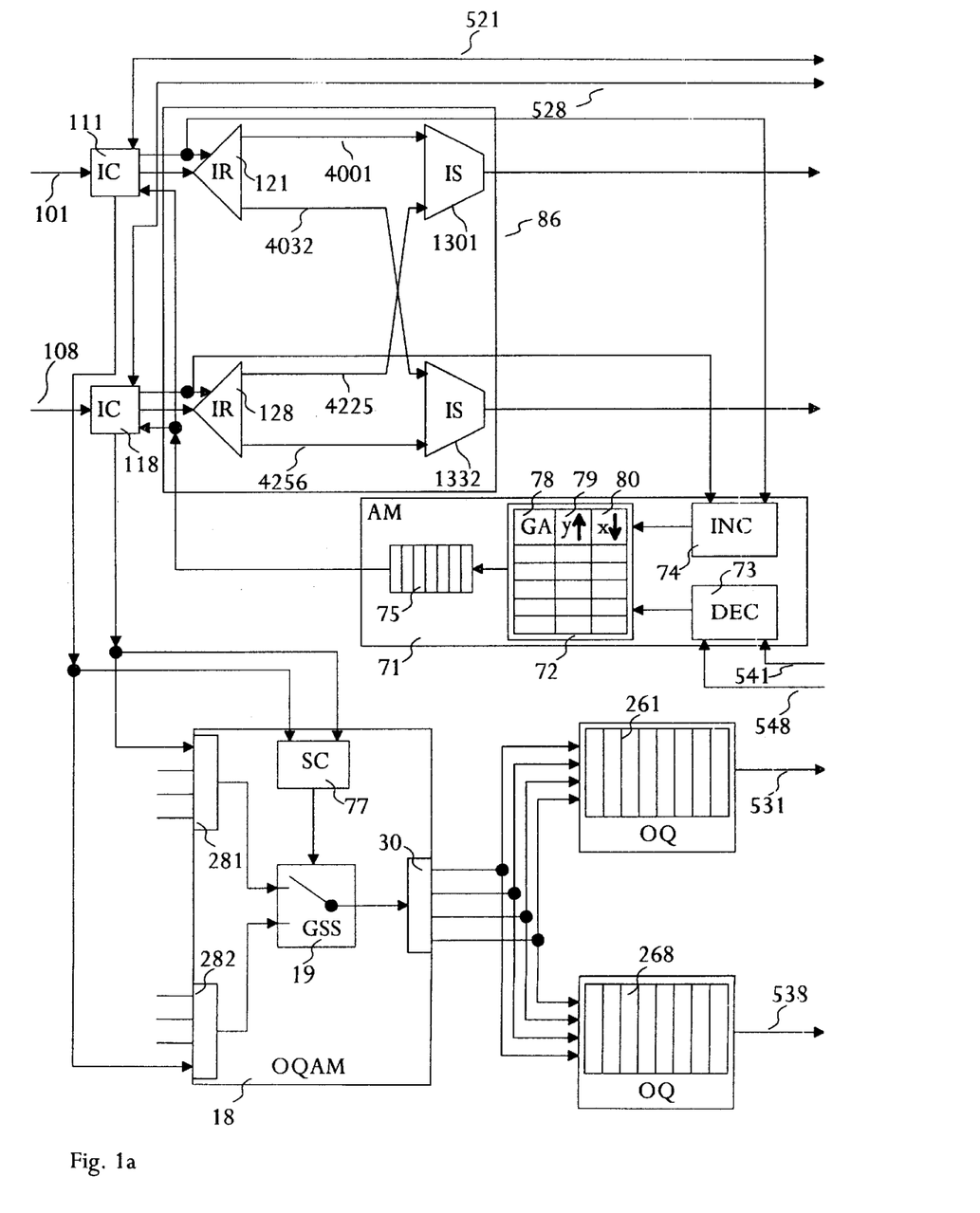
Figure 1B:
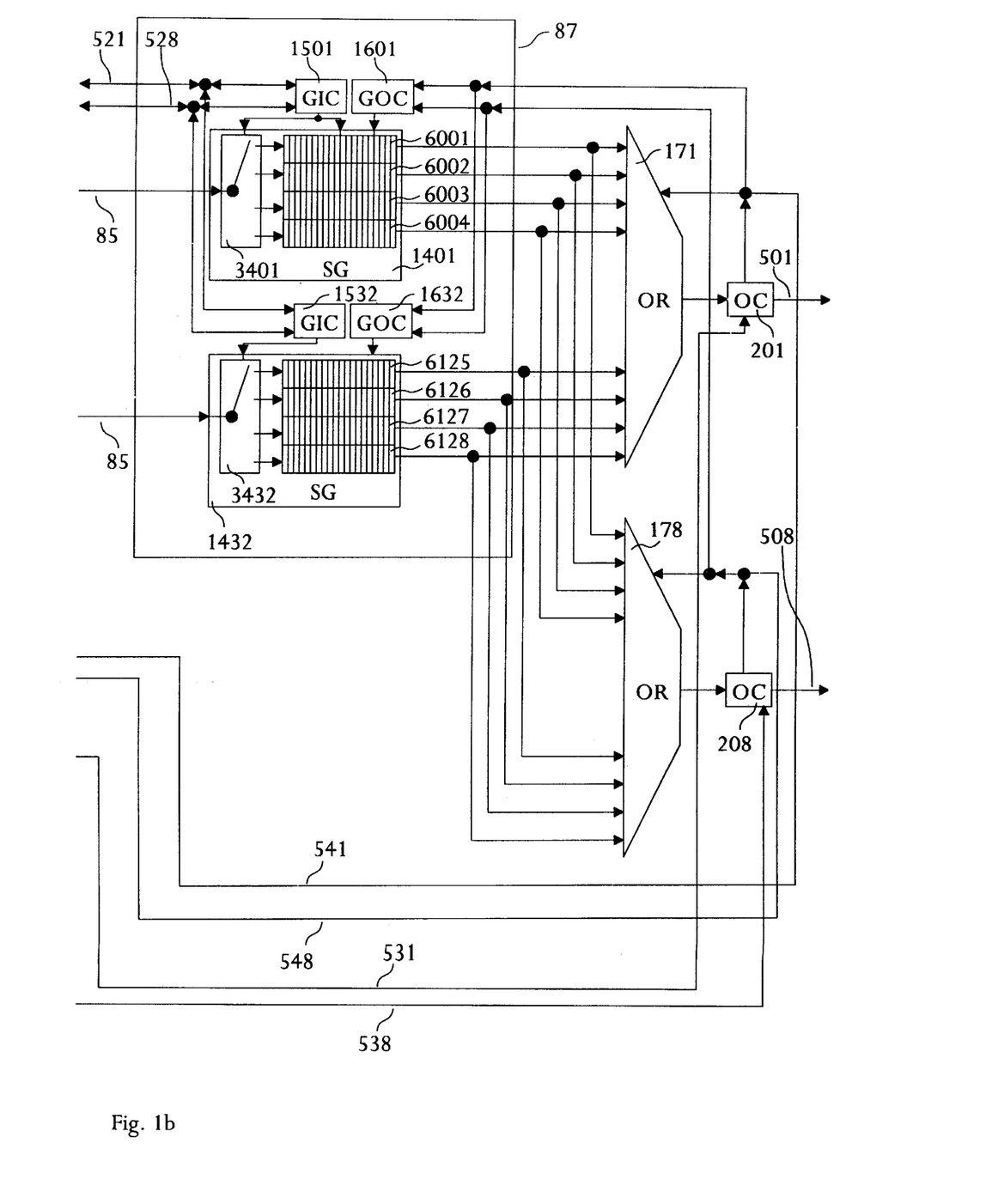
Figure 2:
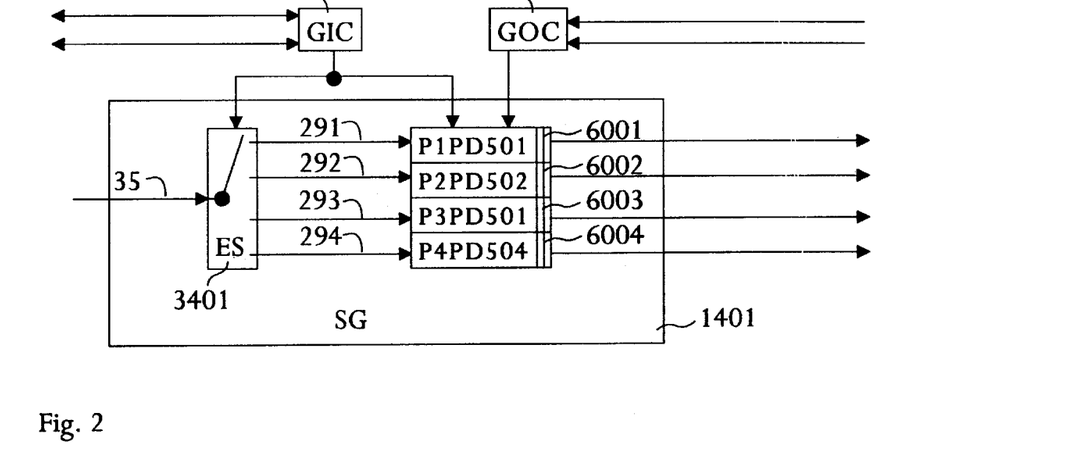
FIG. 2: an example for a storage group with four small-sized packet payloads, FIG. 3*a:* an example for a storage group with two medium-sized packet payloads, FIG. 3*b:* an example for a storage group with one big-sized packet payload.

The apparatus shown in FIGS. 1a,b and 2 comprises eight input ports 101–108 which are connected to eight input controllers 111–118 which incorporate the function of a translation means. Each one of said input controllers 111–118 is connected to one corresponding of eight ensuing input routers 121–128. Every input router 121–128 is connected via one of 256 router connection lines 4001–4256 to every one of 32 input selectors 1301–1332. The input routers 121–128, the router connection lines 4001–4256 and the input selectors 1301–1332 together form an input means 86. Each of the 32 input selectors 1301–1332 is connected via one of 32 cell selector switches 3401–3432 to one corresponding of 32 storage groups 1401–1432. The cell selector switches 3401–3432 serve as switching means. Each of the storage groups 1401–1432 has as switch control means its assigned group input controller 1501–1532 and as group output controlling means its assigned group output controller 1601–1632. Every group input controller 1501–1532 is connected via one of eight bidirectional lines 521–528 to each input controller 111–118. Each storage group 1401–1432 comprises such a group of four storage cells 6001–6128 and has four corresponding storage outputs. Hence there are 128 storage cells 6001–6128, divided up in groups of four. Every cell selector switch 3401–3432 has one switch input 85 connected to the input means 86 and has four switch outputs 291, 292, 293, 294, each of them leading to one of the storage cells 6001–6128 of one of the storage groups 1401–1432. The storage groups 1401–1432 together form a storing means 87. Every output of every storage group 1401–1432 is connected to every one of eight output routers 171–178 which together are defined as output means. Each of the eight output routers 171–178 is connected to exactly one of eight output controllers 201–208.

A bookkeeping means in form of an address manager 71 comprises an address lookup table 72 which contains a storage matrix with 32 rows and 3 columns 78, 79, 80. The first column 78 contains comparators which are dedicated to the storage group addresses of the storage groups 1401–1432. The second column 79 contains a first counter and the third column 80 a second counter. The address manager 71 further comprises an incrementing section 74 and a decrementing section 73. The address lookup table 72, the incrementing section 74 and the decrementing section 73 together form a counting means. The incrementing section 74 is connected to all eight input controllers 111–118 and to all eight input routers 121–128. The decrementing section 73 has also eight inputs being connected via eight decrementer input lines 541–548 to the eight output controllers 201–208 and connected to the eight output routers 171–178. The eight decrementer input lines 541–548 between the decrementing section and the output routers 171–178, respectively the output controllers 201–208 are also connected to each of the 32 group output controllers 1601–1632. The decrementing section 73 as well as the incrementing section 74 are connected to the address lookup table 72 which itself is connected to an address queue 75 with 32 queuing places. The address queue 75 has an output which leads to every input controller 111–118. A queue controlling means in form of an output queue access manager 18 has eight inputs which are connected respectively to the eight input controllers 121–128. The eight inputs are separated into two input groups 281, 282 of four inputs each. Every input group 281, 282 is connected to a group selection switch 19 which has four output lines grouped together as one output group 30.

The output queue access manager 18 further comprises a switch controller 77 which controls the group selection switch 19 and has eight inputs deriving from the input controllers 111–118. Eight output queues 261–268 have each four inputs which are connected all in parallel to the four output lines. Each output queue 261–268 is dedicated and linked via one of eight queue output lines 531–538 to one of the output controllers 201–208. Data outputs of the output controllers 201–208 each lead directly to one of eight output ports 501 to 508. The group output controllers 1601–1632 provide each a read pointer which is dedicated in common to all four storage cells 6001–6128 in the corresponding storage group 1401–1432. The storage cells 6001–6128 all have the same dimensions, e.g. a size of 16 bytes. The packets to be handled with this arrangement can have several sizes, referred to as packet types, e.g. a small packet has 12 bytes of payload length, a medium packet has 32 bytes and a big packet has 64 bytes as payload length.

In use the arrangement is determined to receive only one packet type by programming a corresponding behavior for the cell selector switches 3401–3432, as is explained in detail below. However the programming can be changed for different applications.

An incoming fixed size packet e.g. an ATM-packet is for example arriving at one input port 111 and is entering the corresponding input controller 121. The packet contains information comprising a header and a payload. The header contains a target information about to which of the output ports 501–508 this packet is to be sent. This target information is encrypted in the packet header as a number. The corresponding input controller 121 acts as translation means and therefor contains a list of numbers and a list of corresponding data patterns, e.g. bitmaps. The number of the incoming target information is compared with the stored list of numbers until a matching number has been found. The corresponding bitmap is read out from the list and assigned to the received packet. The target information is by this procedure hence translated into the dedicated bitmap. This bitmap contains eight bits, one for each output port 501–508. The contained bits indicate in binary form if the respective output port 501–508 shall receive this packet or not. Every logical 1 in this bitmap means that the respective output port 501–508 shall receive a copy of the packet. By this bitmap hence a selection of output ports 501–508 is designated. As will be explained below, this is a sophisticated way to handle multicast packets. The assigned bitmap is sent to the switch controller 77 of the output queue access manager 18. The payload of the incoming packet is delivered to the corresponding input router 121.

The address manager's address queue 75 offers to each input controller 111–118 the number of a free storage group address, i.e. an address of a storage group 1401–1432 which is not occupied by undelivered packet payloads. One free storage group address is delivered to each input controller 111–118 by the address queue 75 wherefrom it is in the same time removed. For a high performance every input controller 111–118 has already received a storage group address before a packet has arrived.

The receiving input controller 111 delivers the received storage group address to the corresponding input router 121 and also to the corresponding input group 282 in the output queue access manager 18.

The receiving input controller 111 further sends the assigned bitmap to the incrementing section 74. In the incrementing section 74 the sum of logical 1's in the received bitmap is calculated and sent to the address lookup table 72. There the first counter 79 of the respective storage group address is set to the received value.

When the storage group addresses have been assigned to the input controllers 111–118 before packets arrive, it is possible to set the corresponding counter already to the number of storage cells 6001–6128 in that storage group 1401–1432, e.g. 4, so that only in case of a multicast packet an incrementing step for the incrementing section 74 is needed. This brings the advantage that without increasing the hardware complexity for such waiting storage groups 1401–1432 the comparison of the counter positions delivers a nonequal result which prevents the storage group address from being erroneously reused.

The receiving input router 121 has already set up a connection to the corresponding input selector 1332 of the storage group 1432 whose storage group address it has received. The input selector 1332 has automatically switched the incoming connection to the corresponding storage group 1432. The connection to the input selectors 1301–1332 are for a high performance all already set up when a packet arrives.

The corresponding group input controller 1532 which controls the corresponding storage group 1432 with the storage group address that the receiving input controller 111 has received, receives from the receiving input controller 111 a signal that this storage group 1432 is to be written to.

The group input controller 1532 of the receiving storage group 1432 controls the corresponding cell selector switch 3432 and additionally serves as a write pointer. Since the addressed storage group 1432 contains four storage cells 6125, 6126, 6127, 6128 it is able to store four packet payloads of the small-sized packet type. For the first packet payload to be written the addressed cell selector switch 3432 is directed to the first storage cell 6125 and the write pointer is directed to the first byte. The packet payload is inserted into the first storage cell 6125 of the addressed storage group 1432 while the write pointer is incremented byte per byte. After this procedure the cell selector switch 3432 is incremented to the next storage cell 6126 and the write pointer is reset to the first byte for receiving the next payload of the next incoming packet. While writing the payload into the addressed storage cell 6125 the corresponding group input controller 1532 is transmitting the number of the actual storage cell 6125, determined by the position, of the cell selector switch 3432, to the receiving input controller 111, where this storage cell number is further transmitted to the input group 282 of the output queue access manager 18, from there to the output group 30 and from there to the designated output queues 261–268.

The output queue access manager 18 is connecting the input groups 281, 282 one after the other to the output group 30 and hence to all output queues 261–268. This is done by the switch controller 77 which controls the switching process of the group selector switch 19. The payload address consisting of the received storage cell number and of the received storage group address is then written to the output queues 261–268 in convenience with the bitmap, received by the switch controller 77. Only the designated ones of the output queues 261–268, i.e. the ones which have a logical 1 in the bitmap receive the payload address. The payload address is stored in the respective output queue 261–268 of every output port 501–508 which has to receive a copy of the incoming packet.

Hence with the above arrangement, respectively method, the payload of a packet is stored in the storage cell 6125 and its destination is determined in that the output queues 261–268 assigned to the designated output ports 501–508 contain the entries of the payload address in the corresponding output queues 261–268.

The addressed storage group 1432 remains active until all four storage cells 6125, 6126, 6127, 6128 have been used. This means that the next incoming payload is automatically stored in storage cell 6126, the following in storage cell 6127, a.s.o. Thereby the stored payloads need not be heading for the same output ports 501–508. When the cell selector switch 3432 has performed the selection of each of the four storage cells 6125, 6126, 6127, 6128 within one storage group 1432 a new storage group 1401–1431 is selected from the address queue 75 for the storage of the next four packet payloads. The storing process within one storage group 1432 is always performed sequentially. The cell selector switch 3432 is programmed to switch with a predetermined order among the storage cells 6125, 6126, 6127, 6128.

To read a packet payload from a storage cell 6001–6128 and transport it to one of the designated output ports 501–508 every output controller 201–208 receives from its correspondent output queue 261–268 the next payload address which contains the address of the corresponding storage group 1432 and the number of the corresponding storage cell 6125 where the next payload for this output port 508 is stored. The receiving output controller 508 signals to the group output controller 1632 of the storage group 1432 which contains the storage cell 6125 with the received storage group address that it has to prepare to transmit the stored packet payload. The output controller 208 receives the payload address from the output queue 268 in form of the storage group 1432 and the storage cell 6125 inside of the storage group 1432. The corresponding output router 178 receives also the payload address from the output controller 208 and sets up a connection between the storage cell 6125 with the respective storage cell number and the output controller 208. Then the group output controller 1632 also provides a read pointer and resets this read pointer to the first byte and transmits simultaneously all packets in the storage group 1432 to its storage outputs. When, as is for example the case in this example, for reading out from the storage group 1432 only one storage cell 6125 is connected to an output controller 208 only the content of this storage cell 6125 is read out. However, since only copies are made during the reading procedure, this being called nondestructive reading, the other packet payloads in the same storage group 1432 are not lost but can be read, in a later readout process. When receiving the packet payload the output controller 208 sends a signal to the decrementing section 73. The second counter 80 is then incremented by one.

When the first counter 79 and the second counter 80 both have equal values the comparator 78 realizes that the storage group address of the corresponding storage group 1432 is entered again into the address queue 75.

All storage groups 1401–1432 are independent and can receive packet payloads independently, hence asynchronously. However, only one payload can be written at once into a storage group 1401–1432.

The input means 86 can also be substituted by an arrangement of 32 times an 8-to-1 router, respectively a 8-to-1 multiplexer.

The described arrangement can perform within each storage group 1401–1432 a synchronous readout of the contained storage cells 6001–6128. This means that a second output controller 201–207 willing to read a packet payload from the same storage group 1401–1432 must wait until the packet payload being currently read is read out entirely, i.e the read pointer has reached again the first byte of the storage cells 6001–6128. This fact may serve as a criterion for the dimensioning of the size of the storage groups 1401–1432. A small number of storage cells 6001–6128 grouped in one storage group 1402–1432 means a low probability that several output ports 501–508 simultaneously request to receive packet payloads from the same storage group 1401–1432. On the other hand there is the fact that a high number of storage cells 6001–6128 in one storage group 1401–1432 means a lesser the expenditure on hardware, namely the input routers 121–128 and the input selectors 1301–1332, because one storage group 1401–1432 has only one switch input 85.

To keep the waiting-time for a blocked output port 501–508 low, the storage cells 6001–6128 within one storage group 1401–1432 should all be filled up to an equal extent. Then, during the readout procedure the read pointer from the group output controller 1601–1632 is reset to the first byte of the storage cells 6001–6128 immediately after having reached the last occupied byte in all storage cells 6001–6128, which is faster than waiting for the read pointer to reach the last byte of the storage cells 6001–6128. The readout process and the storing process are generally independent from each other. Hence, a readout process for a certain packet payload can already be started when its first byte has been stored.

The above arrangement has been described exemplarily for four small-sized packets, whereby the relation between packet size and storage group size is herein called a grouping factor 4 (packets per group). The device is however also suited to handle medium size packet types, i.e. packet types whose size exceeds the length of a single storage cell 6001–6128 but is smaller than two storage cells 6001–6128. The switching device can be programmed the way that the payload of such a packet is then split up into two payload fragments which each are stored in separate, subsequent storage cells 6001–6128.

Figure 3A:
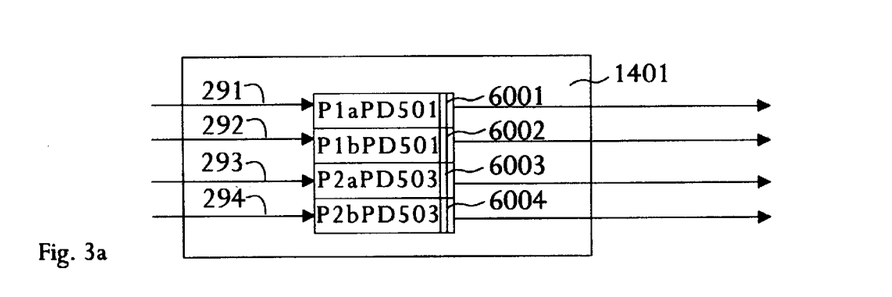

Such a solution is depicted in FIG. 3a. A first packet is split up into a first payload fragment P1aPD501 (i.e. Packet Nr. 1, fragment a, Packet Destination Output port 501) and a second payload fragment P1bPD501 (i.e. Packet Nr. 1, fragment b, Packet Destination Output port 501). The first payload fragment is stored in storage cell 6001, the second payload fragment in the subsequent storage cell 6002. The same occurs to a second packet divided into a first payload fragment P2aPD503 and second payload fragment P2bPD503. Hence in the storage group 1401 two medium-sized packets are stored. This relation between packet size and storage group size is herein called a grouping factor 2 (packets per group). Concerning the whole hardware arrangement of the switching device with its settings, the only difference to grouping factor 4 is a different programming of the switching behavior of the cell selector switches 3401–3432 and hence of the group input controllers 1501–1532 and for the reading process of the group output controllers 1601–1632.

In all cases the cell selector switches 3401–3432 perform a strict switching between the subsequent storage cells 6001–6128. Each storage group 1401–1432 is connected to the input means 86 by only one input line, namely at the switch input 85. This leads to a restriction of the required size of the input means 86. In the above case the number of outputs of the input means 86 is divided by four compared to a known switching device. The address queue 75, comprises a pool of all free storage group addresses whereby each storage group address consists of four physical addresses (storage cell numbers). Each access to a storage group address means an access to a whole storage group 1401–1432 and a storage group 1401–1432 can only be re-added to the pool of free storage group addresses when all four storage cells 6001–6128 in this specific storage group 1401–1432 have been read out.

Multicast packets are realized by storing only once their payload and entering the respective payload address into several output queues 261–268. The choice of output queues 261–268 is determined by the bitmap. The counting means 72, 73, 74 provides control that the corresponding storage cells 6001–6128 and the corresponding storage groups 1401–1432 are not used again until the last copy of the multicast packet payload stored therein has been read.

The storage group 1401–1432 is in this arrangement the smallest entity of memory, having one write pointer and four switch outputs 291–294. The four switch outputs 291–294 are grouped together by the cell selector switch 3401–3432. Hence a storage group 1401–1432 has one general input, namely the switch input 85 and one write pointer. Since only one packet payload can be written to a storage group 1401–1432 at a certain point of time and all packet payloads arriving at one storage group 1401–1432 are deriving from the same input port 101–108, no packet payload will ever have to wait to get stored. Hence all storage groups 1401–1432 are independent from each other, which means that each of them can start to receive a packet payload independent from the other storage groups 1401–1432. Consequently, the input ports 101–108 can receive incoming packets independent from each other. An elastic buffer to synchronize the input ports 101–108 or a de-skew logic is therefore not required.

Regarding the synchronous readout of packet payloads in one storage group, situations can be imagined where small differences in arrival time of the packets cause a bigger latency during the synchronous readout procedure. Nevertheless, such problems are minimized since for asynchronously received packets which are queuing in different output queues 261–268 an automatic synchronization occurs when the first packet of such a queue has been queued for a waiting time while being blocked.

Figure 3B:
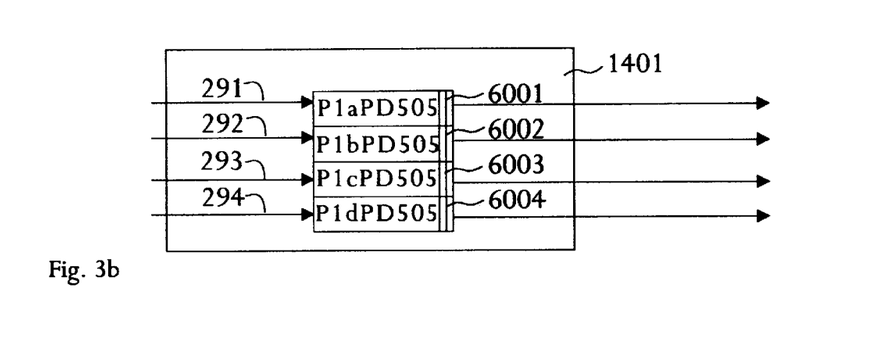

In FIG. 3b a third relation between packet size and storage group size which is called a grouping factor 1 is depicted, i.e. the storage of one packet of a big-sized packet type which is therefor divided into four payload fragments P1aPD505, P1bPD505, P1cPD505, P1dPD505 which are stored in the four storage cells 6001–6128 of one storage group 1401–1432. As is shown in this figure the packet payload fragments P1aPD505, P1bPD505, P1cPD505, P1dPD505 are all shorter than the length of one storage cell 6001–6004 but therefore all fragments have an equal length. As explained above, this proves better for a faster readout process. During readout of such a big-sized packet the output router 171–178 is sequentially connected to each of the four storage cells 6001–6004.

The possibility of a definition of grouping factors makes the switching device a universal device for different applications. Irrespective of the size of the packet type the chip memory is always exploited at its maximum.

The output queues 261–268 can be divided up into different priority sections which let higher-prior payload addresses pass by those with lower priority what in the end means that these payloads are read out earlier.

The readout of payloads from the various storage groups 1401–1432 can be performed asynchronously as well as synchronously. In synchronous transmission mode, all storage groups 1401–1432 are synchronized for reading. This means that there is an additional latency in synchronous transmission mode due to waiting for the synchronization point, which here is defined as the point of time when the write pointer points to the first byte of all corresponding storage cells 6001–6128 in its corresponding storage group 1402–1432. However, there are defined multiple synchronization points, depending on the grouping factor. For grouping factor 1 there are four synchronization points during the reading time for one packet. For grouping factor 2 there are two synchronization points, since a packet is longer than one storage cell. For grouping factor 4 there is only one synchronization point. Regarding the absolute amount of time the maximum latency is always the same, namely the length of the storage cell, e.g. here 16 bytes. This time is of course reduced, if the storage cells 6001–6128 have not all bytes filled with data of a stored payload. Then the read pointer is reset to the first byte immediately after the last payload byte, e.g. after 12 bytes.

The output routers 171–178 can be realized as a blocking output routers. This means that the output routers 171–178 while performing readout of a payload from a selected storage group 1401–1432 prevent all accesses of other output routers 171–178 to the same storage group 1401–1432. Then the output routers 171–178 can be decreased in size by arranging behind every storage group 1401–1432 a multiplexing device with one output and four inputs, the output being connected to every output router 171–178, the inputs being connected to the outputs of the respective storage group 1401–1432. This multiplexing device then acts like an inverted version of the cell selector switch 3401–3432 and allows access only to one of the storage cells 6001–6128 of a storage group 1401–1432 at one moment in time. Longer access times for blocked output ports 501–508 hence appear more likely. However, as already explained, a low probability of coincidental simultaneous access of several output ports 501–508 to the same storage group 1401–1432 is the fact and will keep this delay acceptable low.

In the output queue access manager 18 several data patterns, respectively bitmaps can be processed in parallel, as well as the corresponding received payload addresses can be parallely processed. The following numeric example enlightens the background. The storing procedure of a packet payload with a size of 12 bytes, while assuming a clock cycle of 8 ns and a processing speed of one byte per clock cycle takes a total storing time of 96 nanoseconds. This is the maximal acceptable time during which the storage group address queuing procedure for all input ports 101–108 has to be completed. With a number of 32 input ports 101–108 and the same number of output ports 501–508 and output queues 261–268, the input ports 101–108 being divided up into groups of four and with each group being processed during one clock cycle, the routing of the payload addresses into the output queues 261–268 takes 8 clock cycles, hence 64 ns which is clearly shorter than 96 ns. Hence a parallelity of four simultaneously processed payload addresses is here the minimum to satisfy the necessity to perform the payload address queuing in time.

The switching device's architectural principle is suitable for arbitrary choice of dimension which is also called scalablility. This means that by varying the dimension some or all components of the switching device, the wanted number of input ports 101–108, output ports 501–508 and/or storage cells 6001–6128, respectively storage groups 1401–1432 can be chosen. The above described hardware arrangement can be varied while still maintaining the basic principle of the invention. For example the incrementing section 74 need not be connected to the input controllers 111–118. They can also be connected to the outputs of the output group 30 and receive then only the bitmap-derived incremention value for the input ports 101–108 which are processed at one point of time there. Further, the bitmap need not be received by the switch controller 77 but can also be received by the input groups 281, 282. Then an interpretation of the bitmap's content can be performed in the output group 30. Generally, the interconnections which are depicted as being connected via the same line with several components may also be realized as a bus connection or as separated lines.

In the following section, arrangements will be described which incorporate several of the above switching devices. For sake of clearness all switching devices have been depicted with only two input ports and two output ports, but of course the examples work identically with a larger number of input ports and output ports.

The switching device is best suited to be scaled up to enhance its performance. It is useable therefor as a scaleable module for a scaled system. There exist different modes of expansion: Size expansion, i.e. an increase of the number of ports, memory expansion for achieving a higher data throughput and speed expansion for achieving a higher port speed.

Figure 4:
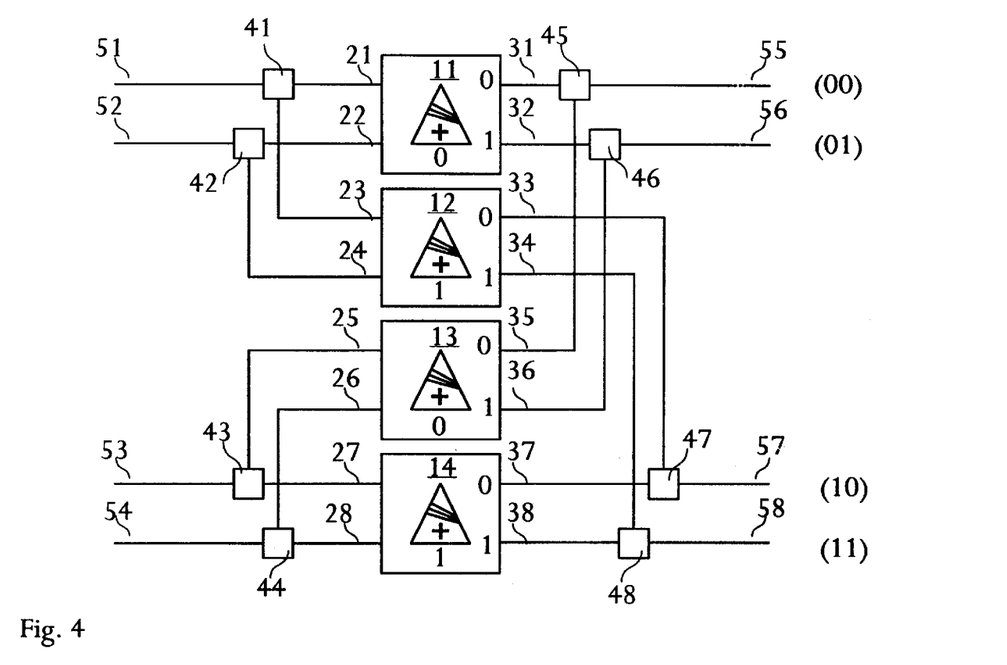
FIG. 4: a port-expanded arrangement with four switching devices.

For size expansion a single stage and a multistage arrangement are possible. The single stage version is depicted in FIG. 4. This design has a shorter delay than a multistage network and the number of switching devices grows with $n^2$, n being the multiplication factor for the expansion of input ports.

In FIG. 4 four switching devices 11, 12, 13, 14 are combined. The first switching device 11 has two input ports 21, 22 and two output ports 31, 32. The second switching device 12 has two input ports 23, 24 and two output ports 33, 34. The third switching device 13 has two input ports 25, 26 and two output ports 35, 36. The fourth switching device 14 has two input ports 27, 28 and two output ports 37, 38. A first system input 51 is connected to a first selector means 41 which has two outputs, one connected to input port 21 and one to input port 23. A second system input 52 is connected to a second selector means 42 which has two outputs, one connected to input port 22 and one to input port 24. A third system input 53 is connected to a third selector means 43 which has two outputs, one connected to input port 25 and one to input port 27. A fourth system input 54 is connected to a fourth selector means 44 which has two outputs, one connected to input port 26 and one to input port 28. A first arbitrator 45 has as first input output port 31 and as second input output port 35. Its output is defined as a first system output 55. A second arbitrator 46 has as first input output port 32 and as second input output port 36. Its output is defined as a second system output 56. A third arbitrator 47 has as first input output port 33 and as second input output port 37. Its output is defined as a third system output 57. A fourth arbitrator 48 has as first input output port 34 and as second input output port 38. Its output is defined as a fourth system output 58.

The whole arrangement now has four input ports, namely the system inputs 51–54 instead of two and also four output ports, namely the system output ports 55–58, but provides full connectability between all input ports and output ports. The selectors 41, 42, 43, 44 serve as address filter. The purpose of such an address filter is to choose to which of the switching devices 11, 12, 13, 14 an incoming packet has to be sent. This is done by using the header of the incoming packet. For instance the whole packet can be duplicated and sent to a filter unit for each switching device 11, 12, 13, 14 whereby only one of the filters is permeable for the packet. Such a filter unit can also be located in the switching devices 11–14. In case of a multicast packet it may be necessary to store the payload in several of the switching devices 11–14, here particularly not in more than two of them. Furthermore, the arbitrators 45, 46, 47, 48 choose which of the switching devices 11, 12, 13, 14 has the right to give his packet from its output port 31–38 to one of the system outputs 55, 56, 57, 58. Destination control with this arrangement is mainly restricted to an automatism using directly the destination information from the packet header. As an example for two inputs and two outputs a two bit binary coding is depicted. System output 55 has binary code 00. System output 56 has binary code 01. System output 57 has binary code 10. System output 58 has binary code 11. Furthermore the switching devices have been assigned a binary digit, namely switching device 11 the digit 0, switching device 12 the digit 1, switching device 13 the digit 0 and switching device 14 the digit 1. Each switching device 11–14 has further a code for each output port 31–38. The odd numbers of the output ports bear a 0 and the even numbers a 1. A packet arriving at any of the system inputs 51–54 with the destination code of a certain system output 55–58 in its header will arrive automatically at this system output 55–58. For example the first bit of the destination code is used by the selectors as identification for the switching devices 11–14. The second bit identifies which output port of the identified switching device 11–14 is to choose. Destination "10" hence means for a packet arriving at the system input 53 the choice of output 37 of the switching device 14. This works for all system input/system output combinations. Of course the coding will differ if a bigger number of input ports 21–28 and output ports 31–38 and/or system inputs 51–54 and system outputs 55–58 is used.

Handling of packets with the above arrangement using the coding numbers for the different switching devices 11–14 and/or output ports, can also be managed with bitmaps, as they are already used for multicast packets. This means that all packets are handled as multicast packets and are hence assigned a bitmap and that the packets are simply multiplicated in the selectors 41–44 and sent to several switching devices 11–14. The bitmap is then just adapted to the arrangement of the switching devices 11–14 in that a packet which is arriving at a switching device 11–14 where it has not to be stored is assigned a bitmap consisting exclusively of logical "0", whereas for the correct switching device 11–14 the bitmap depicts the right output port 31–38 where the packet has to be sent. With such a bitmap also adapting the coding of the output ports 31–38 of the switching devices 11–14 can easily be handled by shifting the bitmap e.g. by half of its number of bits. This method proves best, when the whole arrangement is already designed and to be used for multicast packets.

To maintain the modular concept of the switching devices 11, 12, 13, 14, it is possible to modify the arrangement in that the arbitrators 45, 46, 47, 48 and also the selectors 41, 42, 43, 44 are symmetrically integrated with the switching devices 11, 12, 13, 14 on one common circuit board. This is called On-Board-Arbitration an saves hardware expenditure.

Figure 5:
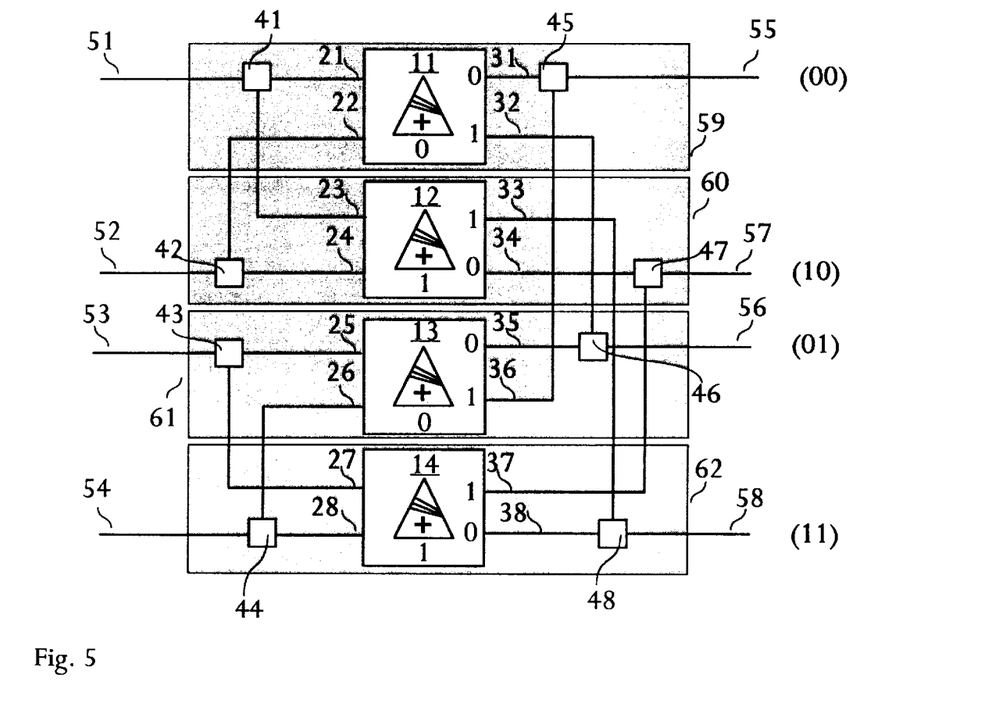
FIG. 5: a port-expanded arrangement with four PCB's.

An arrangement comprising an On-Board-Arbitration layout is depicted in FIG. 5. The numbering from FIG. 4 has been kept as far as identical elements are concerned. Each switching device 11–12 is now arranged on a separate printed circuit board (PCB) 59, 60, 61, 62. The selectors 41–44 are arranged exactly as the selectors 41–44 in FIG. 4 but are now evenly distributed, such that on each PCB 59–62 one selector 41–44 is arranged. On the other side of the switching devices 11–14, however, the connections between the arbitrators 45–48 and the switching devices 11–14 had to be rearranged in order to get identically built PCB's 59–62. The first arbitrator 45 has now as first input output port 31 and as second input output port 36. Its output is defined as the first system output 55. The second arbitrator 46 has now as first input output port 32 and as second input output port 35. Its output is defined as the second system output 56. A third arbitrator 47 has now as first input output port 34 and as second input output port 37. Its output is defined as the third system output 57. The fourth arbitrator 48 has now as first input output port 33 and as second input output port 38. Its output is defined as the fourth system output 58. In fact, all PCB's 59–62 now are identical, which simplifies production.

For this hardware arrangement, however, destination control has to be managed via a redirection of packets. Whereas the switching devices 11 and 12 do not need any redirection, the switching devices 13 and 14 show an inverse behavior of the second bit which means that for example packets with destination 01 are in fact delivered to destination 00. This dilemma can be solved e.g. by implementing a mapping function in the adaptors which send the packets. This solution may prove not optimal since then the switch system structure is not transparent for the adapters and a change in the system results in many changes in many adapters. Another solution is adding a redirectioning means to the selectors 41–44 which recognizes such problematic combinations and assigns the corrected code to such packets. This complicates the hardware structure.

Figure 6:
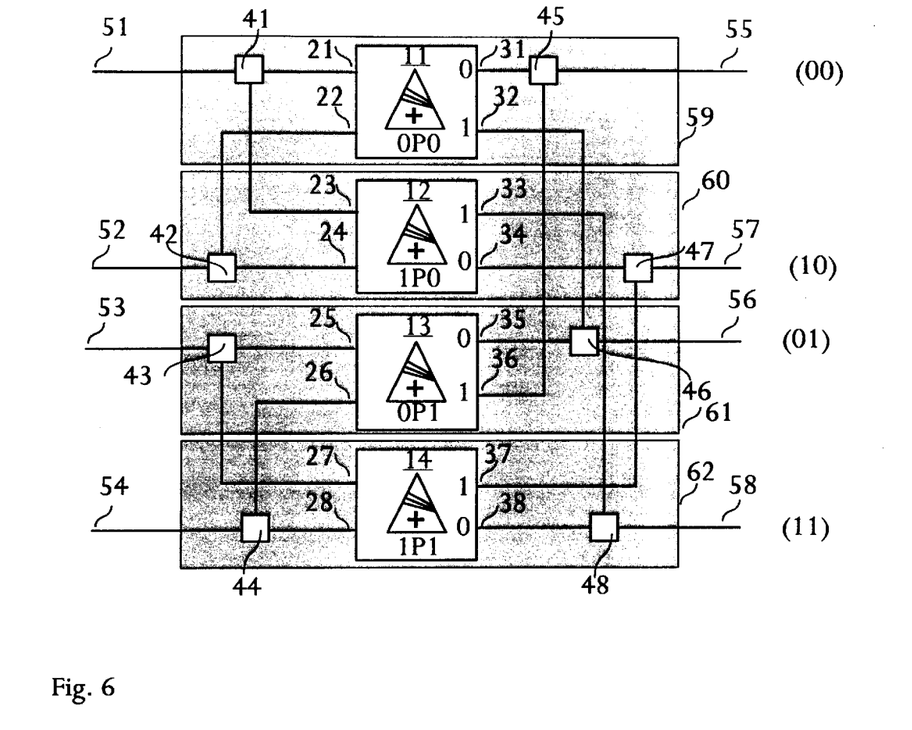
FIG. 6: a port-expanded arrangement with portmapping-type switching devices.

Another solution to this problem is to implement a port-mapping means into the switching devices 11–14. This is shown in FIG. 6. Again the numbering from the previous figures has been maintained concerning identical elements.

Every switching device 11–14 comprises now a port-mapping means which is programmed according to the application of the switching device 11–14. To illustrate that, in the figures each switching device 11–14 has been assigned an enlarged identification. Switching device 11 has now the enlarged identification 0P0. Switching device 12 has now the enlarged identification 1P0. Switching device 13 has now the enlarged identification 0P1. Switching device 14 has now the enlarged identification 1P1. The portmapping information for each switching device 11–14 is hence contained in the "P0" or "P1" designation. "P0" means that the binary code of the output ports 31–38 of the respective switching device 11–14 remains unchanged. "P1" means that the bit numbers of the output ports of the respective switching device have to be inverted for a correct packet deliverance. By a simple programming of the portmapping means the whole hardware of all PCB's 59–62 can be fabricated identically which results in cheaper production costs. For arrangements with more ports the inversion of bits will be substituted by an exchange of port identifications, namely by a shift of the port identifications about the half number of ports. The port-mapping means may consist of a simple lookup table whose contents are programmably adapted to the system structure or even multiple lookup tables which are chosen corresponding to the system structure. The second solution is more easily programmable. For multicast packets it proves best to locate the port-mapping means within the output queue access manager 11 so that the bitmap can be used to determine the designated output ports 31–38 before port-mapping is performed.

Figure 7:
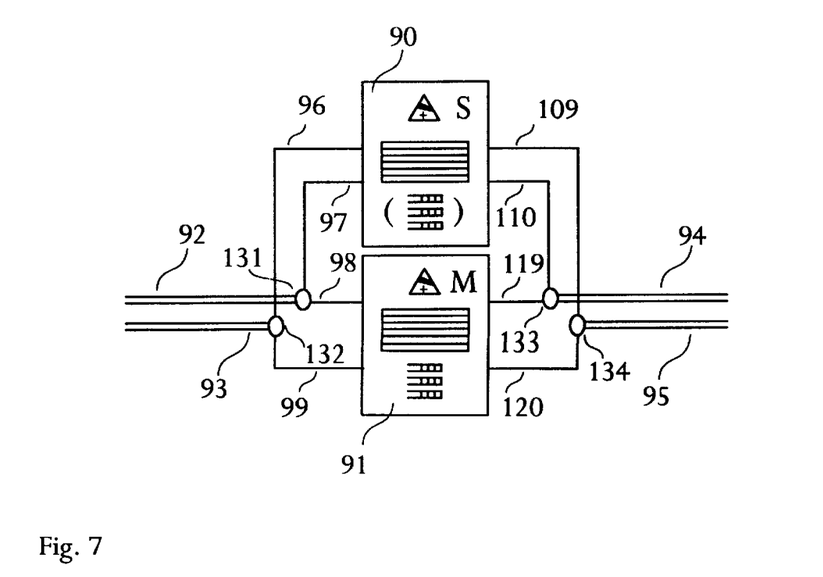
FIG. 7: a speed-expanded arrangement.

Speed expansion can be done by link paralleling or by a master/slave arrangement. A master/slave arrangement is depicted in FIG. 7.

A first switching device 90 and a second switching device 91 are arranged in parallel. A first system input 92 is divided up into two input ports 97, 98 by a first splitting means 131. A second system input 93 is divided up into two input ports 96, 99 by a second splitting means 132. The input ports 96, 99 belong to the first switching device 90 and the input ports 98, 99 belong to the second switching device 91. The first switching device 90 has a first output 109 and a second output 110. The second switching device 91 has a first output 119 and a second output 120. The outputs 109 and 120 are combined to a first system output 94 by a first grouping means 133 and the outputs 119 and 110 are combined to a second system output 95 by a second grouping means 134.

The input ports 96–99 are divided up by the splitting means 131, 132 such that half of the incoming bits of one byte of an incoming packet is delivered to the first switching device 90 and the other half is delivered to the second switching device 91. The first switching device 90 is called the master device and the second switching device 91 is called the slave device. The master/slave arrangement uses the memory section (storing means, input means, output means) and the routers of both switching devices 90, 91 but only the control section (queue controlling means, output queues, bookkeeping means) of the master device 91. The routing process in the slave device 90 is identical to the one in the master device 91. Due to that it is principally possible to use as slave device 90 a chip which does not contain any control section. Furthermore, it is possible to use as master device 91 a chip without any memory section.

Since by this splitting up of data the packet payloads are reduced in length, fewer memory space per switching device 90, 91 is needed to store a whole packet payload. By this packet length reduction the routing time is significantly reduced too. Additionally, more storage cells in the switching devices 90, 91 are usable for storing payloads, which increases the performance by reducing the probability of backpressure, i.e. a signalization starting from one or more of the switching devices directed to a previous switching device or a packet sending device indicating that the corresponding packet cannot be received due to a fill memory or a full output queue. The grouping means 133, 134 simply put together the arriving bit groups from the master device 91 and the slave device 90 which belong together to reobtain the entire packet.

For memory expansion, respectively performance expansion several switching devices can be connected in parallel. Each switching device works in parallel, but at one moment always only one switching device is active concerning one output port. This is controlled by an input arbitration device. Each of the switching devices receives a predetermined minimum amount of packets per output queue, until the input arbitration device switches to another outout queue for the same output port in another switching device. Then the input arbitration device signalizes to the next switching device that this device is requested to take over the duty and receive packets for this output port. This may go on in a circle. The order of packets for each output port is maintained by using marking information which tells an output arbitration device which switching device contains the output queue which contains the next payload address for the packet to be delivered to a specific output port. This marking information can for instance be added to the last packet before the next packet is stored in a different switching device.

All expansion arrangements can be combined with each other and bring even higher performance.

The switching device is suited best for broadband communications, based on ATM. However with appropriate adapters, the concept can be applied for non-ATM architectural environments too. Single-stage or multi-stage switch fabrics can be constructed in a modular way. The shared memory can also be expanded by linking multiple switching devices.

It should be noted, that all functions described above need not be performed by an exact arrangement of elements as described. For example the storage cell number needs not be transmitted to the output queue access manager 18 by the group input controller 1501–1532 but can get there in different equivalent ways. Obviously the only important fact is that this storage cell number shall be stored in the corresponding output queue 261–268 to complete the payload address. Also,, the function of the selectors 41–44 need not be concentrated in the selectors 41–44 but can be distributed and even be integrated with the corresponding part of the selector 41–44 on a pcb 59–62 or even inside of a switching device 11–14.

What is claimed is:

1. Switching device for transporting incoming fixed-size packets of data containing a destination header and information in form of a payload, from a plurality of input ports (101–108) to a plurality of output ports (501–508), comprising input means (86) for transporting said payload of said incoming packets to storing means (87) which contains a plurality of storage cells (6001–6128) and comprising output means (171–178) for reading out said stored payloads and delivering them to a selection of said output ports (501–508), the selection being predetermined by said destination header, characterized in that at least one switching means (3401–3432) is provided which comprises more switch outputs (291–294) which are each connected to one of said storage cells (6001–6128), than switch inputs (85) where said payloads are arriving from said input means (121–128, 4001–4256, 1301–1332) and that at least two of said switch outputs (291–294) are dedicated to one common of said switch inputs (85) and that said switching means (3401–3432) is able to lead said payloads from said switch input (85) to its dedicated switch outputs (291–294) while switching between said dedicated switch outputs (291–294) in a predetermined order.

2. Switching device according to claim 1, characterized in that for handling differently-sized packet types of said incoming packets, said storage cells (6001–6128) connected to said switching means (3401–3432) are dimensioned such that their size is smaller than the size of said payload of a big-sized packet type and at least as big as the size of said payload of a small-sized packet type and that in case of arrival of one packet of said big-sized packet type said switching means (3401–3432) is controllable in a way that said payload of said big-sized packet type is divided up into payload fragments to be stored in sequential cells of said storage cells (6001–6128) connected to said switching means (3401–3432).

3. Switching device according to claim 2, characterized in that the number of said dedicated storage cells (6001–6128) of said switching means (3401–3432) is chosen such that the sum of their cell sizes suffices to store at least the entire payload of one packet of a predetermined biggest-sized packet type which is to be handled with said switching device.

4. Switching device according to one of claims 1 to 3, characterized in that all said dedicated storage cells (6001–6128) connected to one of said switching means (3401–3432) are grouped together in a single storage group (1401–1432) with one assigned group output controlling means (1601–1632) for controlling a synchronous readout process for said storage cells (6001–6128) in said storage group (1401–1432).

5. Switching device according to claim 1 characterized in that, for each of the output ports (501–508) a dedicated output queue (261–268) is provided, for receiving and delivering to a dedicated output controller (201–208) a piece of information about which of said storage cells (6001–6128) contains said payload which is to be delivered to said output port (501–508) corresponding to said output queue (261–268).

6. Switching device according to claim 5, characterized in that switch control means (1501–1532) is provided for controlling the switching position of said switching means (3401–3432) and for delivering information about this switching position as part of said piece of information about which of said storage cells (6001–6128) contains said payload which is to be delivered to said output port (501–508), to said output queues (261–268).

7. Switching device according to claim 1 characterized in that translation means is provided for translating said header into a data pattern which contains information about to which of said output ports (501–508) said incoming packet is to be transported.

8. Switching device according to one of claim 6 and 7, characterized in that queue controlling means (18) is provided for receiving said data pattern and for transmitting said piece of information about which of said storage cells (6001–6128) contains said payload which is about to be delivered to said output port (501–508) corresponding to said output queue (261–268), to said output queues (261–268) determined by said data pattern.

9. Switching device according to claim 8, characterized in that said queue controlling means (18) is designed to receive in parallel a plurality of said data patterns and to transmit in parallel to said output queues (261–268) a plurality of said pieces of information about which of said storage cells (6001–6128) contains said payload which is to be delivered.

10. Switching device according to claim 1 characterized in that counting means (73, 74, 72) is provided for counting the number of readout processes for each of said storage groups (1401–1408) and/or said storage cells (6001–6128) to determine whether a payload has been entirely delivered to its corresponding output ports (501–508).

11. Switching device according to claim 10 characterized in that said counting means (73, 74, 72) is designed to receive information derived from said data pattern as offset value for the counting of said readout process.

12. Switching device according to claim 11, characterized in that said counting means comprises for each of said storage groups (1401–1408) and/or said storage cells (6001–6128) a first counter (74, 79) for receiving said information from said data pattern and a second counter (73, 80) for counting the number of corresponding readout processes and comparator means for comparing the values of said counters (73, 74, 79, 80).

13. Switching device according to claim 12 characterized in that it is designed such that said payload of incoming packets of a multicast type is stored only one time in said storing means and read out several times.

14. Switching device according to claim 13 characterized in that bookkeeping means (71) is provided which comprises an address queue (75) which contains the addresses of said storage groups (1401–1408) and/or said storage cells (6001–6128) which do not contain undelivered payloads.

15. Method for transporting incoming fixed-size packets of data containing a destination header and information in form of a payload, from a plurality of input ports (101–108) to a plurality of output ports (501–508), comprising a step of transporting said payload of said incoming packets to storing means (1401–1432) which contains a plurality of storage cells (6001–6128), and a step of reading out said stored payloads and delivering them to a selection of said output ports (501–508), the selection being predetermined by said destination header, characterized in that said payloads are delivered via switching means (3401–3432) which comprises more switch outputs (291–294) which are each connected to one of said storage cells (6001–6128), than switch inputs (85) where said payloads are arriving from said input means (121–128, 4001–4256, 1301–1332), at least two of said switch outputs (291–294) being dedicated to one common switch input (85), from said switch input (85) to said dedicated switch outputs (291–294) while switching between said dedicated switch outputs (291–294) in a predetermined order.

16. Method according to claim 15, characterized in that differently-sized packet types of said incoming packets are handled by dimensioning said storage cells (6001–6128) connected to said switching means (3401–3432) such that their size is smaller than the size of said payload of a big-sized packet type and at least as big as the size of said payload of a small-sized packet type and in case of arrival of one packet of said big-sized packet type said switching means (3401–3432) is controlled in a way that said payload of said big-sized packet type is divided up into payload fragments which then are stored in sequential cells of said storage cells (6001–6128) connected to said switching means (3401–3432).

17. Method according to claim 16, characterized in that the number of said dedicated storage cells (6001–6128) of said switching means (3401–3432) is chosen such that the sum of their storage cell sizes suffices to store the entire payload of one packet of a predetermined biggest-sized packet type which is to be handled with said switching device.

18. Method according to one of claims 15 to 17, characterized in that all said dedicated storage cells (6001–6128) connected to one of said switching means (3401–3432) are grouped together in a single storage group (1401–1432) with one assigned group output controlling means (1601–1632) for controlling a synchronous readout process for said storage cells (6001–6128) in said storage group (1401–1432).

19. Method according to claim 15 characterized in that for each of said output ports (501–508) a dedicated output queue (261–268) is receiving and delivering to its dedicated output queue (261–268) a piece of information about which said storage cells (6001–6128) contains said payload which is to be delivered to said output port (501–508) corresponding to said output queue (261–268).

20. Method according to claim 19, characterized in that the switching position of said switching means (3401–3432) is controlled and information about this switching position is delivered as part of said piece of information about which of said storage cells (6001–6128) contains said payload which is to be delivered to said output port (501–508), to said output queues (261–268).

21. Method according to claim 15 characterized in that said header is translated into a data pattern which contains information about to which of said output ports (501–508) said incoming packet is to be transported.

22. Method according to one of claims 20 and 21 characterized in that said data pattern is received in a queue controlling means (18) and transmitted as said piece of information about which of said storage cells (6001–6128)

contains said payload which is to be delivered to said output port (501–508) corresponding to said output queue (261–268) to said output queues (261–268) determined by said data pattern.

23. Method according to claim 22, characterized in that said queue controlling means (18) is receiving in parallel a plurality of said data patterns and transmitting in parallel to said output queues (261–268) a plurality of said pieces of information about which of said storage cells (6001–6128) contains said payload which is to be delivered.

24. Method according to claim 15 characterized in that counting means (73, 74, 72) is counting the number of readout processes for each of said storage groups (1401–1408) and/or said storage cells (6001–6128) to determine whether a payload has been entirely delivered to its corresponding output ports (501–508).

25. Method according to claim 24 characterized in that said counting means (73, 74, 72) is receiving information derived from said data pattern as offset value for the counting of said readout processes.

26. Method according to claim 25, characterized in that in said counting means (73, 74, 72) in a first counter (74, 79) for each of said storage groups (1401–1408) and/or said storage cells (6001–6128) said information from said data pattern is received and in a second counter (73, 80) the number of corresponding readout processes is counted and in a comparator means the values of said counters (73, 74, 79, 80) are compared.

27. Method according to claim 15 characterized in that in an address managing means (71) which comprises an address queue (75) addresses of said storage groups (1401–1408) and/or said storage cells (6001–6128) are queued which do not contain undelivered payloads.

28. Method according to claim 15 characterized in that in an address managing means (71) which comprises an address queue (75) addresses of said storage groups (1401–1498) and/or said storage cells (6001–6128) are queued which do not contain undelivered payloads.

29. Switching apparatus comprising a plurality of switching devices (11–14) according to one of claims 1 to 3, characterized in that the input ports (21–28) of said switching devices (11–14) are connected in parallel via selection means (41–44) which effect a selection of one of said switching devices (11–14) for receiving an arriving packet and that the output ports (31–38) of said switching devices (11–14) are connected in parallel via arbitration means (45–48) which effect a selection of one of said switching devices (11–14) for delivering an outgoing packet from one of said output ports (55–58).

30. Switching apparatus according to claim 29, characterized in that each of said switching devices (11–14) is grouped together with one of said arbitration means (45–48) and with one of said selection means (41–44) as a scaleable module (59–62).

31. Switching apparatus according to claim 30, characterized in that port-mapping means is provided which effects an assignment of the output ports to the destination header of the incoming packets in accordance with the interconnection of the plurality of said switching devices (11–14).

32. Switching apparatus comprising a plurality of switching devices (90, 91) according to one of claims 1 to 3, characterized in that the input ports (96–99) of said switching devices (90, 91) are connected to splitting means (131, 132) which split up a byte of an incoming packet into groups of bits which are each delivered to one of the switching devices (90, 91) and in that the output ports (109, 110, 119, 120) are connected to grouping means (133, 134) which put together bit groups deriving from said switching devices (90, 91).

* * * * *